United States Patent [19]
Huntley

[11] Patent Number: 5,891,346
[45] Date of Patent: Apr. 6, 1999

[54] SPENT CAUSTIC SYSTEM

[75] Inventor: Allan R. Huntley, Northwood, England

[73] Assignee: Stone & Webster Engineering Limited, Buckinghamshire, England

[21] Appl. No.: 846,679

[22] Filed: Apr. 30, 1997

[30] Foreign Application Priority Data

May 1, 1996 [GB] United Kingdom .................... 9609146

[51] Int. Cl.⁶ ....................................................... C02F 1/72
[52] U.S. Cl. ............................................ 210/761; 210/752
[58] Field of Search ..................................... 210/188, 199, 210/205, 218, 220, 255, 750, 752, 758, 761; 422/231

[56] References Cited

U.S. PATENT DOCUMENTS

| | | | |
|---|---|---|---|
| 3,054,602 | 5/1962 | Proudman | 210/255 |
| 3,761,409 | 9/1973 | McCoy et al. . | |
| 3,849,536 | 11/1974 | Morgan et al. . | |
| 3,945,918 | 3/1976 | Kirk . | |
| 3,963,611 | 6/1976 | Dardene-Ankringa, Jr. . | |
| 4,179,365 | 12/1979 | Sumi . | |
| 4,347,144 | 8/1982 | Bodenbenner et al. . | |
| 4,372,940 | 2/1983 | Brandenburg et al. . | |
| 4,415,452 | 11/1983 | Heil et al. | 210/220 |
| 4,417,986 | 11/1983 | Connaught et al. . | |
| 4,584,107 | 4/1986 | Odaka et al. . | |
| 4,666,689 | 5/1987 | Maple et al. . | |
| 4,746,434 | 5/1988 | Grieves et al. . | |
| 4,793,931 | 12/1988 | Stevens et al. . | |
| 4,948,511 | 8/1990 | Swanson et al. . | |
| 5,080,793 | 1/1992 | Urlings | 210/255 |
| 5,244,576 | 9/1993 | DeRoeck et al. . | |
| 5,368,726 | 11/1994 | Masoomian | 210/206 |

FOREIGN PATENT DOCUMENTS

| | | |
|---|---|---|
| 0051967 | 5/1982 | European Pat. Off. . |
| 0313489 | 4/1989 | European Pat. Off. . |
| 669091 | 3/1952 | United Kingdom . |
| 812648 | 4/1959 | United Kingdom . |
| 1453659 | 10/1976 | United Kingdom . |
| 1453660 | 10/1976 | United Kingdom . |
| 2254015 | 9/1992 | United Kingdom . |

OTHER PUBLICATIONS

A.G. Smith, "Ridding Process Waters and Caustic Solutions of Sulphide", Oil and Gas Journal, Jul. 9, 1956, pp. 95–99.

J.D. Martin and L.D. Levanus, "New Column Removes Sulfide with Air", Hydrocarbon Processing and Petroleum Refiner, 41 May 1962, pp. 149–153.

Otto Abegg, "A Plant for the Oxidation of Sulphide–Containing Refinery Wastes by Air", Erdol and Kohl, Erdgas, Petrochemie, vol. 14, No. 8, pp. 621–626 (1961).

Otto Abegg and Johannes Elster, "A Plant for the Oxidation of Sulphide–Containing Refinery Wastes by Air", Erdol and Kohl, Erdgas, Petrochemie, vol. 15, No. 9, pp. 721–722 (1962).

Yi–Shon Chen and P. Douglas Burgess, "Spent Caustic Treatment and Disposal", Proceedings of the 42nd Industrial Waste Conference, May 1987.

M. Sitting, "Petroleum Refining Industry", Engergy Saving and Environmental Control, ©1978.

*Primary Examiner*—Jay H. Woo
*Assistant Examiner*—Betsey J. Morrison
*Attorney, Agent, or Firm*—Hedman, Gibson & Costigan, PC

[57] ABSTRACT

The invention provides a process for treating a sulfide-containing alkaline aqueous effluent, which includes subjecting it to a wet air oxidation treatment which oxidizes sulfide ions to environmentally acceptable sulfur acid ions, the oxidation being carried out in two or more chambers connected in series, flow of effluent between the chambers being effected at least primarily by gravity such that the pressures in the respective chambers can be maintained at substantially the same value.

8 Claims, 1 Drawing Sheet

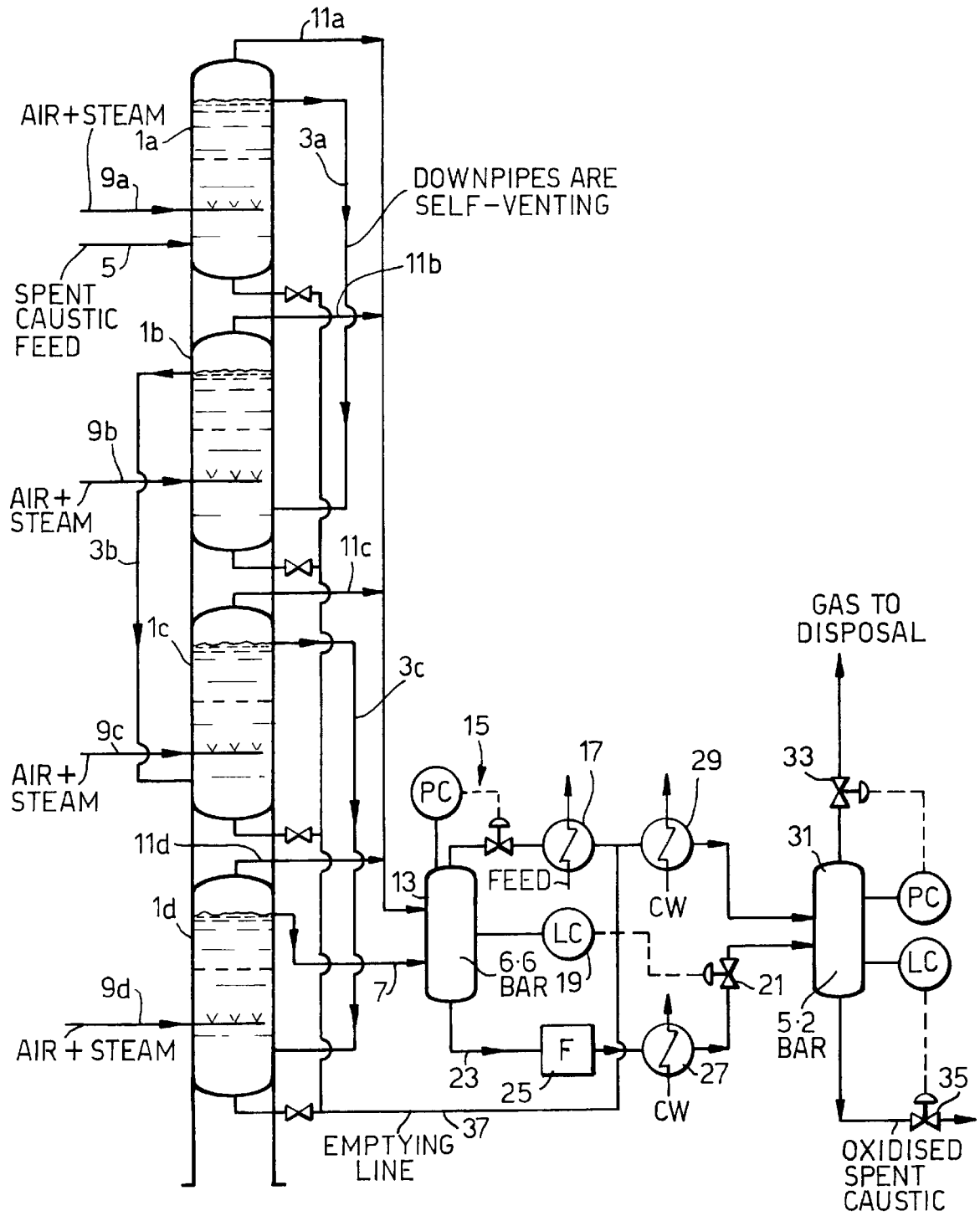

SPENT CAUSTIC SYSTEM

FIELD OF THE INVENTION

This invention relates primarily to the continuous treatment of alkaline solutions which have been used in industrial processes (effluents) so that the solutions may be disposed of with less detriment to the environment, in particular so that the chemical oxygen demand (COD) of the effluent is reduced. The invention is particularly applicable to aqueous alkaline solutions which contain sulfide ion.

BACKGROUND OF THE INVENTION

It has been conventional in the petrochemical industry to scrub gases produced by cracking for ethylene production (or by other hydrocarbon conversion processes), with aqueous sodium hydroxide solution. Such a scrubbing treatment removes hydrogen sulfide and carbon dioxide primarily as sodium sulfide, sodium carbonate and sodium bicarbonate and also removes some of the higher molecular weight hydrocarbon constituents carried by the cracked gas stream. Discharge of such effluent would be environmentally harmful and at the very least neutralization is necessary. However, neutralization of the raw effluent involves regeneration of carbon dioxide and some of the hydrogen sulfide but still leaves a substantial content of hydrogen sulfide and sulfide ions which have a high COD. Processes have therefore been developed to oxidize the sulfide (and other inorganic sulfur acid salts) in the alkaline solution to at least thiosulfate ion and generally to the more environmentally acceptable sulfate ion, before neutralization. Such oxidation processes are generally Wet Air Oxidation (WAO) processes in which gaseous oxygen in the form of fine bubbles is contacted with spent caustic in contacting columns for relatively long residence times. The basic WAO process has been known for many years. Such a process which oxidizes to thiosulfate is described in Smith, A. G., "Ridding Process Waters and Caustic Solutions of Sulphides", Oil and Gas J, Jul. 9, 1956, p.95–99. Two articles by Otto Abegg in the publication Erdol und Kohle, Erdgas, Petrochemie (1) Vol. 14, No. 8, p.621–626 (1961) and (2) Vol. 15, No. 9,p.721–722 (1962) describe experiments aimed at complete conversion of sulfide to sulfate in the WAO process. Other descriptions of WAO processes are included for example in Martin, J. D. and Levanas, L. D., "New Column Removes Sulfide with Air", Hydrocarbon Processing & Petroleum Refiner, 41, May 1962, p. 149–153 and in U.S. Pat. No. 3,963,611 assigned to Chevron Research Company and U.S. Pat. No. 3,761,409 assigned to Texaco Inc. Various process variables are described such as temperature, pressure and steam injection as well as gas/liquid contacting devices and co-current and counter-current arrangements with and without catalysts.

Our earlier UK Patent No. 2,254,015 also describes a development of the WAO process.

Low pressure WAO processes, typically requiring only two stages of air compression to achieve 7–10 bars, can be more economical and reliable than WAO processes operating at higher pressures with more stages of compression. More complete oxidation therein is strongly favoured by higher temperature and residence time, and more contacting stages. Such processes have been carried out in a series of oxidation reactors, with liquid flow driven from one reactor to the next by keeping the reactor pressures at sufficiently different values. For a low pressure air supply, typically at approximately 7 bars, three reactors in series can be used in this way, but the resulting outlet pressure from the third reactor would be insufficient to drive the liquid through any additional reactors and their control valves.

SUMMARY OF THE INVENTION

The present invention provides a process for treating a sulfide-containing alkaline aqueous effluent, which comprises subjecting it to an oxidation treatment which oxidizes sulfide ions to environmentally acceptable sulfur acid ions, the oxidation being carried out in two or more chambers connected in series, flow of effluent between the chambers being effected at least primarily by gravity such that the pressures in the respective chambers can be maintained at substantially the same value. With this arrangement, the maximum number of contacting stages is not limited by the air supply pressure.

One example of the invention is illustrated in the accompanying drawing.

BRIEF DESCRIPTION OF THE DRAWING

FIG. 1 shows diagrammatically a preferred embodiment of the present invention.

DETAILED DESCRIPTION OF THE INVENTION

In the apparatus shown in the drawing four reaction chambers or drums $1a$, $1b$, $1c$ and $1d$ are connected in series by respective lines $3a$, $3b$ and $3c$. The first chamber $1a$ has an inlet line 5 and the last chamber $1d$ has an outline line 7. The alkaline aqueous effluent (spent caustic) enters a lower part of each chamber and leaves an upper part of each chamber. As it moves upwards it is contacted by bubbles of air and steam supplied through lines $9a$, $9b$, $9c$ and $9d$ in conventional manner. Excess gas is taken from the top of each chamber $1a$, $1b$, $1c$ and $1d$ by respective lines $11a$, $11b$, $11c$ and $11d$ and fed into a first separation chamber 13 to which outlet line 7 is also connected. Excess gas is allowed to pass out of the effluent and leaves chamber 13 via a pressure controller 15 and a heat exchanger 17 which serves to heat the effluent entering through line 5. As mentioned above a reaction pressure of about 7 bars is frequently suitable and the chamber 13 is maintained at the same pressure (a pressure of 6.6 bars is shown by way of example in the drawing). A level controller 19 associated with the chamber 13 maintains the liquid level by operation of a valve 21 in a liquid discharge line 23 provided with a filter 25 and a cold water heat exchanger 27. Likewise gas leaving the heat exchanger 17 passes through a cold water heat exchanger 29. The gas and liquid then pass to a further separation chamber 31 (shown as having a pressure of 5.2 bars) from which the gas is discharged to atmosphere via a pressure-controlled valve 33 and the liquid is discharged for further treatment (or passage to a drain) via a liquid-level controlled valve 35. An emptying line 37 is shown for emptying chambers $1a$, $1b$, $1c$ and $1d$ for servicing of the apparatus.

In operation all four chambers $1a$, $1b$, $1c$ and $1d$ are kept at the same pressure and liquid flows by gravity through connection lines $3a$, $3b$ and $3c$. The major part of the lengths of these lines is shown as vertical but it could be inclined. Their cross-sectional area should be sufficiently great to allow bubbles to rise upwardly in a countercurrent direction so that foam is not carried over between the chambers to an appreciable extent. Any floating solid matter such as polymer flows out of the chamber $1a$, $1b$, $1c$ and $1d$ with the liquid since the outlets are at the level of the liquid surface.

In practice the chambers $1a$, $1b$, $1c$ and $1d$ are stacked together in a single column but other arrangements permitting a gravity feed are possible. No control instrumentation is required in the column itself. All the controls are associated with the common facilities downstream. The higher average pressure favours the mass transfer of oxygen to the spent caustic. It also reduces the amount of water vapour carried out of the reactor chambers by the spent air, which reduces the amount of steam required to maintain the desired temperature.

The number of reactor chambers stacked together is limited only by economics. If more stages are required than can be economically stacked together, an additional reactor column can be provided in series, with a pump to lift the spent caustic to the upper reactor chamber in the second column. The second column operates at the same pressure as the first.

Although the invention has been described in terms of a WAO process for treating spent caustic effluents, it is also applicable to other gas/liquid reactors which are carried out in chambers connected in series, particularly other WAO treatments which similarly require dispersion of the air in very small bubbles, long liquid residence times, and multiple stages to achieve high conversions in continuous flow reaction systems.

The invention also extends to apparatus for carrying out the process, comprising two or more pressurizable chambers arranged so that liquid from an upper chamber can flow through a line from an upper part thereof to a lower part of a lower chamber at least primarily by gravity, and means for injecting gas into the liquid in each chamber.

Gravity transfers between stages in a multi-stage reactor system of reasonable height are strongly preferable to pumped transfers, because of their simplicity; they have no moving parts, no control instrumentation, and nothing to break down. However, economic considerations limit the total height of a series of vertically-stacked reactor stages. If many stages are needed, this may therefore require more than one vertical vessel assembly, with pumped transfers between adjacent assemblies.

I claim:

1. A process for treating a sulfide-containing alkaline aqueous effluent, which comprises subjecting it to a wet air oxidation treatment which oxidizes sulfide ions to environmentally acceptable sulfur acid ions, the oxidation being carried out in two or more chambers connected in series, flow of effluent between the chambers being effected at least primarily by gravity such that the pressures in the respective chambers are maintained at substantially the same value.

2. A process according to claim 1 wherein the chambers are stacked one above the other.

3. A process according to claim 2 wherein liquid enters the lower part of each chamber and leaves from the upper part of each chamber.

4. A process according to claim 1 further comprising the step of injecting air into the liquid in each chamber.

5. A process according to claim 4 further comprising the step of injecting steam into the liquid in each chamber.

6. A process according to claim 1 wherein the pressure in each chamber is about 7 bars.

7. A process according to claim 1 wherein said series of chambers comprises a first chamber and a last chamber, and further comprising the step of passing the liquid from the last chamber to at least one gas/liquid separator to which a gas is also supplied.

8. A process according to claim 1 further comprising the step of allowing the liquid to flow between the chambers through a conduit or conduits of sufficient cross-sectional area to permit any bubbles to move upwardly in a countercurrent direction.

* * * * *